United States Patent

[11] 3,620,590

[72] Inventor Ronald C. Barker
  Weston, Mass.
[21] Appl. No. 828,184
[22] Filed May 27, 1969
[45] Patented Nov. 16, 1971
[73] Assignee Applied Laser Technology, Incorporated
  Wilmington, Del.

[54] HOLOGRAPHIC METHOD AND APPARATUS FOR INFORMATION STORAGE AND RETRIEVAL
  11 Claims, 1 Drawing Fig.
[52] U.S. Cl. .................................... 350/3.5,
  40/2.2, 350/162 SF
[51] Int. Cl. ............................ G02b 27/22,
  G09f 3/03
[50] Field of Search ............................ 350/3.5,
  162 SF; 40/2.2

[56] References Cited
  OTHER REFERENCES
Lohmann, IBM Tech. Disclosure Bulletin, vol. 8, p. 1402 (3/1966).
Leith et al., J. Opt. Soc. Am., vol. 56, p. 523 (4/1966)
Horvath et al., Laser Focus, pp. 18–24 (6/1967).

Primary Examiner—David Schonberg
Assistant Examiner—Robert L. Sherman
Attorney—Seidel, Gonda & Goldhammer ABSTRACT: A holographic method and apparatus for storing and retrieving information only by authorized persons, particularly used for identifying the bearer of a record of such information, comprises storing the information on a record medium as a hologram, scrambling the image of the information on the hologram so that it cannot be recreated except by authorized persons using a master code, and then recreating the scrambled holographic image using apparatus that eliminates the effect of the master code. The information is recreated and displayed using apparatus for displaying holograms which further includes a master code hologram that is reciprocated across the optical axis of the display apparatus so as to eliminate the scrambling effect of the master code on the hologram. The master code may consist of a series of parallel randomly undulating lines.

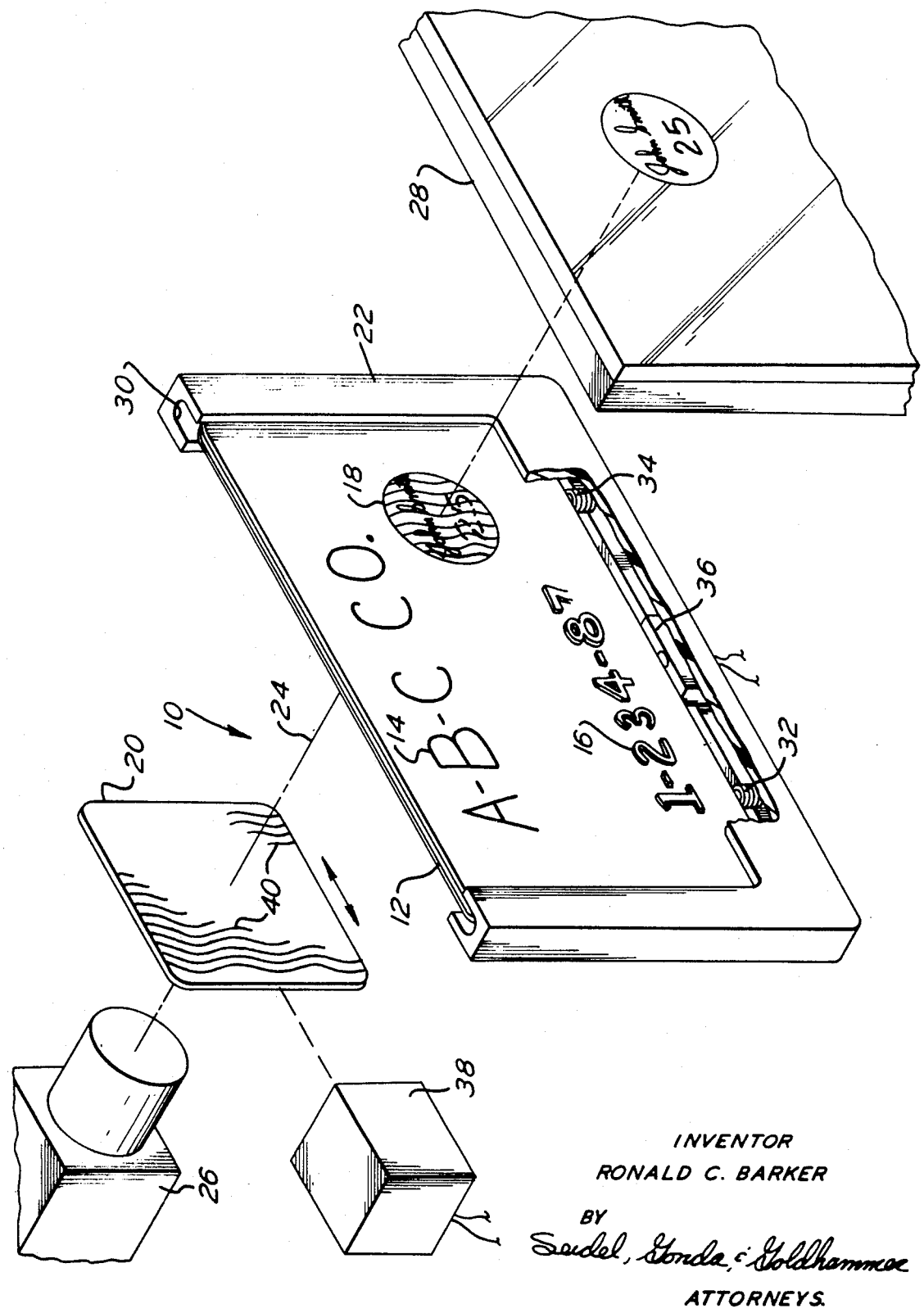

HOLOGRAPHIC METHOD AND APPARATUS FOR INFORMATION STORAGE AND RETRIEVAL

This invention relates to a holographic method and apparatus for information storage and retrieval. More particularly, this invention relates to a method and apparatus for effecting the method using holography and has as its preferred form a method and apparatus for storing identifying information on an identification means such as a credit card so that it can be determined whether or not the bearer of the identification means is an authorized bearer.

The growth of the use of credit to charge purchases of goods and services to individual accounts in the United States and abroad has created a number of management problems. Among these is the improper and illegal use of the means for identifying the individual or individuals entitled to credit. Such identification means is generally referred to as a "credit card" and hence will be referred to by that name herein.

In its present form a credit card is usually an oblong piece of laminated plastic which bears the name of the enterprise authorizing the credit, the name of the person entitled to the credit, and some other form of indicia identifying the person. The identifying indicia usually takes the form of a nine- or 10-digit number in a font capable of being read by automatic reading means. The name of the person and the identifying indicia are usually embossed on the credit card so that they may be imprinted on an invoice. In addition, most credit cards have a place for the person's signature. This signature may be compared with the signature of the bearer on an invoice for purposes of making identification.

As stated above, there are very serious problems arising through the improper and illegal use of the typical credit card. The term "illegal use" is used herein to mean the unauthorized use of a credit card by a person or persons not named on the credit card or not in privy with the person so named. Examples of illegal use would be a use by a person who has come into possession of a stolen or lost credit card. The term "improper use" as used herein means use by a person or persons who are properly in possession of the credit card, but whose credit has been revoked or has been overextended.

Regardless of whether the use of the credit card falls within either the improper use or illegal use category, it is important that the enterprise selling the goods or services on credit granted by means of the credit card have a more certain way of identifying the bearer of the card.

The purpose of this invention is to provide a means for eliminating or at least substantially reducing the illegal use of credit by providing a method and apparatus for identifying the bearer of the identification means as being the person or persons to whom the credit or the like has been issued. Such identification means, if properly used, should eliminate or substantially reduce the illegal use of credit cards.

In its present form, the only means for identifying the bearer of a credit card as the properly authorized person is to compare his signature with the signature appearing on the credit card. The disadvantage in this method of identification is that with a minimum of practice, almost any person can render a passable forgery of another person's signature. The invoice is usually hurriedly signed by the bearer in a cramped space. The seller of the goods or services is usually pressed for time and almost certainly inexperienced in comparing signatures. Thus, almost any passable forgery can be sufficient.

Upon analysis, it should be apparent that one of the worst faults of the present day credit cards is that the very system for identifying the bearer provides the means for unauthorized use. In other words, a credit card carries in full view the signature of the true person entitled to use the same, thereby giving the unauthorized user a full opportunity to forge the signature.

Based on the foregoing observation, it has been determined that the approach should be to conceal the identifying indicia, such as a signature, picture, mark, number or the like, in such a manner that it can be observed only by authorized persons, such as the seller of the goods or serviced on credit. The criteria for such a concealment must be that not only is the identifying indicia concealed from direct view by a person having only the credit card in his possession, but also the indicia must be made unobservable except through the use of a specialized viewing system which cannot be duplicated except with specialized equipment such as a code device.

The solution to the problem as provided by this invention is to use a holographic technique. Anyone familiar with the use of holograms knows that the hologram itself cannot be viewed without the assistance of some form of display apparatus. In the case of interferometric holography, this may consist of a source of coherent light such as provided by a laser, a means for creating an image or virtual image of the hologram and a display of the resultant two- or three-dimensional image. As thus far described, the use of holography answers one-half the problem in that a holographic image of the identifying indicia can be mounted in an identification means (credit card) and as thus mounted, it cannot be directly read. However, such a system would only hinder, not prevent illegal use. The recreation of a holographic image is not particularly difficult. Indeed, if one is willing to accept poor resolution, it can be accomplished using a pinpoint source of light rather than a laser.

To meet the second criterion of the solution of the problem, a hologram must be rendered incapable of recreation except through the use of special equipment whose use can be readily restricted. The present invention provides a solution that meets this second criterion.

According to the present invention, the identifying indicia in the hologram is scrambled using a master code in such a manner that recreation of the hologram using standard apparatus will generate unintelligible information. The master code is such that intelligible information can be created from the hologram using cryptographic apparatus which contains a device for deciphering the master code. In the present invention, the deciphering of the master code is a device which eliminates the code's scrambling effect on the hologram.

Thus, the present invention is a method and apparatus for storing and retrieving information from a hologram in such a manner that the retrieval can be performed only by persons in possession of specialized equipment. Although other uses for the disclosed method and apparatus will be apparent to those skilled in the art, the particular purpose disclosed herein is to aid in identifying the bearer of a record medium such as a credit card.

In use, the present invention consists of issuing credit cards on which an identifying mark or marks such as the bearer's signature and a scrambling master code have been holographically recorded. Each seller of goods or services such as retail merchants, hotels, restaurants and the like, is provided with apparatus for recreating the image of a hologram. This apparatus includes a device for eliminating the scrambling effect of the master code. Thus, only persons in possession of the holographic display apparatus which also includes the master code unscrambling device will be able to create a display of the identifying indicia. Unauthorized persons in possession of the credit card will not be able to read the signature since they do not have the specialized display apparatus. Accordingly, they will have no opportunity to practice forging the authorized bearer's signature prior to making an illicit purchase using the credit card. Indeed, the person illegally in possession of the credit card should not even know the true bearer's name. Thus, it is proposed to eliminate the use of embossed names on the credit card. Under these circumstances, the illicit use of a credit card would be all but impossible if the seller and card holder take the proper precautions.

For the purpose of illustrating the invention, there is shown in the drawings a form which is presently preferred; it being understood, however, that this invention is not limited to the precise arrangements and instrumentalities shown.

The drawing illustrates in schematic form apparatus for performing the method of the present invention.

Referring now to the drawing in detail, wherein like numerals indicate like elements, there is shown a schematic representation of a device for recreating a holographic image in accordance with the present invention designated generally as 10. Only the apparatus 10 for recreating a holographic image is shown since this is sufficient to describe the invention. Apparatus for making a hologram image is not shown since this is conventional and well known in the art.

According to the preferred embodiment of the invention, the record bearing medium is a credit card 12 made in a conventional manner. It should be recognized, however, that the information can be contained in many other types of record mediums. The general purpose of this invention is to provide a means for recreating information contained within the medium only by the use of authorized methods and apparatus. The specific preferred use to which their invention is to be put is the identification of bearers of credit cards. Accordingly, the invention is described in that context, although it is not so limited.

The credit card 12 outwardly bears all of the information which is conventional to most credit cards. Thus, the name 14 of the enterprise issuing the credit card appears near the top portion of the front face and an embossed identification number 16 is positioned adjacent the bottom edge of the card. To this extend, the card 12 is conventional and hence need not be described in detail.

It should be noted that nowhere on the card does the signature of the authorized bearer appear except in the hologram 15. It would also be desirable to eliminate the bearer's name except insofar as it is part of the hologram. This reduces to a bare minimum the information conveyed to an illegal bearer. However, absence of a name creates administrative problems in handling the card. Hence it may not be desirable in all instances.

The information stored in the hologram 18 may consist of any reasonable identifying information. In its preferred form, the hologram 18 should store the authorized bearer's signature as well as a two-digit identifying number. The signature obviously identifies the bearer both by conveying information as to thebearer's name and also information as to his handwriting. The signature is concealed from observation until such time as the card 12 is inserted in appropriate holographic image recreation apparatus. At that time, the seller of goods and services can compare the image with the signature on the invoice for such goods or services to determine if it is proper. It therefore should be apparent that only the authorized bearer should know the information contained within the hologram 18. If this information as recreated in the apparatus 10 compares favorable with that on the invoice, then the seller of goods or services can be certain that the person making the purchase is an authorized bearer.

When the information contained within the hologram 18 contains only the authorized bearer's signature, there is a problem. Credit cards are often stolen along with an authorized bearer's wallet. This wallet more often than not will contain other credit cards with the authorized signature, or if not that, then an identifying name card. Thus, there is a very good possibility that the thief would know the name, if not the form of the signature appearing in the hologram 18.

This problem is overcome by incorporating alpha numerics such as a two-digit number in the hologram 18. This number is specifically chosen and memorized by the authorized bearer. The bearer states the number to the seller when the card is presented. Thus, the combination of a signature together with the number makes positive identification of the bearer almost certain. Since the person in illegal possession of the credit card 12 cannot recreate the image in hologram 18, he should not know the number.

In accordance with the present invention, the hologram 18, consisting of information in the form of a signature "John Smith" and a two-digit number "25" is recorded on a photographic medium. When the photographic film is used directly, the image does not appear, but can be reconstructed by any suitable apparatus. Hologram 18 in accordance with the present invention is preferably a photographic emulsion laminated between two pieces of protective transparent film and then inserted in the card 12 as a plug.

Although a hologram cannot be viewed directly, the signature and number in the hologram 18 are shown on the card 12 in the drawing for illustrative purposes.

The holographic image on the hologram 18 is conventionally created. However, it is modified as created so as to scramble the holographic image. The purpose of scrambling the holographic image is to prevent unauthorized recreation. In accordance with the present invention, a holographic image of a master code is created on the hologram 18 together with the signature and numeral. This master code consists of a device for scrambling the image of the signature and master code in such a manner that when the hologram is recreated, the information is entirely unintelligible. In its preferred form, the master code consists of a filter through which a reference beam is passed. The filter randomizes the phase of the reference light transmitted to the hologram 18. This means that the only way that an image of a signature and number can be reconstructed is by utilizing apparatus that includes an identical filter.

The filter or master code consists of a series of parallel undulating lines 40, preferably in the form of an optical grating. Such a filter 20 is shown in the recreating apparatus 10. The filter used in forming the hologram 18 is identical. As stated above, the filter could be a grating with sufficient lines per millimeter to scramble the image. By way of example this may be 20 to 60,000 lines per millimeter. As shown, the lines are undulating, but parallel to each other. This means that the lines are related in linear fashion along a transverse axis. Stated otherwise, the same point on each line passes through a line normal to the filter 20 as the filter is moved transversely of said normal line.

As thus far described, the hologram 18 meets each of the criteria outlined above. It conceals the identifying information from direct view and it cannot be reconstructed except through the use of specialized apparatus. This specialized apparatus is described below.

As shown, the apparatus for recreating the image in hologram 12 includes a credit card holder 22 which positions the credit card 12 along an optical axis 24 extending from the coherent light source 26 through the filter 20, the hologram 18 to the display means 28. The foregoing is not meant to be a complete apparatus for recreating a holographic image. Such apparatus is well known. Rather, only those parts which are essential to this invention and which are required to describe the nature of the invention are illustrated.

The holder 22 may consist of any device adapted to provide what may be described as gross alignment of the hologram 18 along the optical axis 24. In the form shown, it consists of a U-shaped member within which is formed a slot 30 for receiving and retaining the credit card. If desired, a pair of solenoid activated ejection devices 32 and 34 may be positioned in the bottom of slot 30 for ejecting the card when desired. The bottom of slot 30 also contains a switch 36 which acts as a control for a drive mechanism 38 whose purpose is described below. The switch 36 is electrically connected in a circuit such that it closes the circuit when the card 12 is engaged within the slot 30 and thereby causes the drive mechanism 38 to commence operation.

In the preferred form, the source 26 of coherent electromagnetic radiation for reconstructing the image on hologram 18 is a laser which is capable of producing a substantially continuous output of coherent light. Helium, neon or argon lasers would be sufficient for this purpose.

The display apparatus 28 may be any conventional display means capable of reconstructing a hologram and presenting it on a ground glass screen or even forming a photographic image. If a high degree of sophistication is desired, the display apparatus 28 may even be an electronic display device such as a television receiver.

As indicated above, the filter 20 containing the master code is required to reconstruct the image in hologram 18 in some intelligible form. In other words, it must be used to eliminate the randomizing effect of the undulating lines which scramble the image of the signature and the number. It is not sufficient to merely insert the filter 20 in alignment with the optical axis 24. In order to eliminate the scrambling effect of the master code, the undulating lines 40 must be in precise registration with the image of the undulating line in the hologram 18. Such registration must be such that the phase of the light from the filter 20 interferes with the phase of the light from the hologram 18 so that it cancels the scrambling effect of the lines, leaving only the information in the form of the signature and number.

In practice, such precise registration can be obtained under laboratory conditions using precise alignment devices. However, it is very difficult to obtain in a device that is intended to be used for everyday over-the-counter transactions. The slot 30 at best can only provide a gross form of alignment. In accordance with the present invention, it has been determined that constant precise alignment of the filter 20 is not required. Rather it is sufficient to provide only a series of momentary alignments. This is achieved by oscillating the filter 20 transversely of the optical axis 24 using the drive mechanism 38. The result is that each line 40 will cause the light to oscillate in and out of phase. The net result will be that the image display will follow a pattern of good, poor, none, poor, and good. If the filter 20 is oscillated at a high enough rate, the image retention ability of the eye will permit the viewer to see only a continuous display of the information. Thus constant precise alignment is not required. The drive 38 may be conventional such as a multivibrator powering a solenoid. The filter may be reciprocated at 60 Hz. or higher.

The foregoing describes apparatus and method in accordance with the present invention. In use, the recreation apparatus 10 can be provided to each seller of goods or services who honors the credit card of a particular enterprise. The filter 20 containing the scrambling is such that it cannot possibly be duplicated except by copying a master filter. This means that recreation of the intelligible information in hologram 18 can be performed only by persons in possession of the apparatus 10.

Although described for particular application to credit cards, the present invention has many other uses where identification is required. For example, the inventive concepts may be applied to passports, bank books or any record medium used for identifying a bearer.

The present invention may be embodied in other specific forms without departing from the spirit or essential attributes thereof.

It is claimed:

1. A holographic method of storing and retrieving information comprising the steps of creating a holographic image of the information to be stored, recording the image containing the information as a hologram on a photosensitive medium along with a holographic image of a master code on said photosensitive medium, said master code consisting of holographic images which scramble said information so that said information cannot be recreated out of said hologram in the absence of said code, then retrieving said information by aligning said hologram and a second hologram containing said master code along a common optical axis, and translating said hologram and second hologram relative to each other in a reciprocating manner transversely across said optical axis so as to remove the scrambling effect, and displaying said information using a holographic display means.

2. A holographic method in accordance with claim 1 including the step of translating said second hologram transversely of the optical axis and using a series of parallel undulating lines as the master code.

3. A holographic method in accordance with claim 1 including mounting said hologram in a credit card.

4. A holographic method in accordance with claim 1 including mounting said hologram in a credit card, and locating said second hologram and holographic display means at a plurality of locations.

5. A holographic method in accordance with claim 1 including the step of translating said second hologram transversely of the optical axis using an optical grating having a plurality of parallel grating lines.

6. Apparatus for recreating information from a hologram consisting of an image of the information and an image of a master code for scrambling said information to prevent unauthorized recreation of the information, comprising a source of electromagnetic energy, a master code hologram consisting of a holographic image of the master code, means for retaining the hologram in optical alignment with said source and master code hologram, translation means for translating said master code hologram along an axis extending transversely of said optical axis for eliminating the scrambling effect of said master code image in said hologram, and means to display an image of said information.

7. Apparatus for recreating information from a hologram in accordance with claim 6 wherein said master code comprises a series of closely spaced, parallel undulating lines, and the axis of said translation being such that the same point on said master code lines will pass through said optical axis.

8. Apparatus for recreating information from a hologram in accordance with claim 6 including a plurality of such apparatus located at a plurality of locations.

9. Apparatus for recreating information from a hologram in accordance with claim 6 wherein said source of electromagnetic energy is a laser.

10. Apparatus for recreating information from a hologram in accordance with claim 6 wherein said hologram is mounted in a credit car.

11. A method of holographically identifying a credit card comprising the steps of storing information identifying the rightful bearer of the credit card on a hologram together with a master code consisting of images which scramble said information so that said information cannot be recreated from said hologram in the absence of said code, providing a reconstruction beam for recreating an image of said information, locating said recreating means at a plurality of locations, then retrieving said information from said credit card by aligning on a common optical axis a hologram on said credit card and a second hologram containing said master code, and causing said code hologram to cancel said master code recorded on said credit card hologram by translating said code hologram in a reciprocating manner transversely across the optical axis, and then displaying said information.

* * * * *